(No Model.) 5 Sheets—Sheet 1.
J. R. SEVERANCE.
KNOTTING MECHANISM FOR GRAIN BINDERS.
No. 452,456. Patented May 19, 1891.
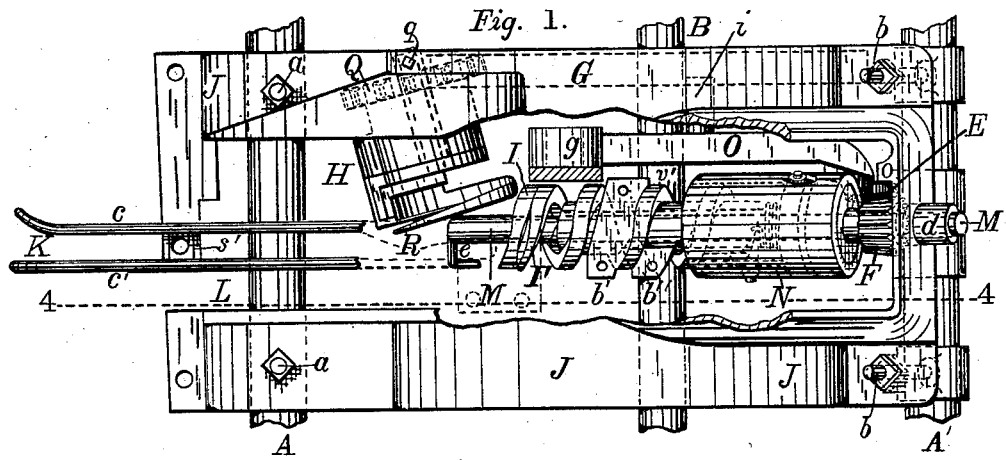
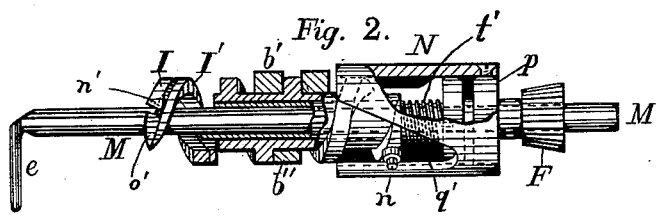
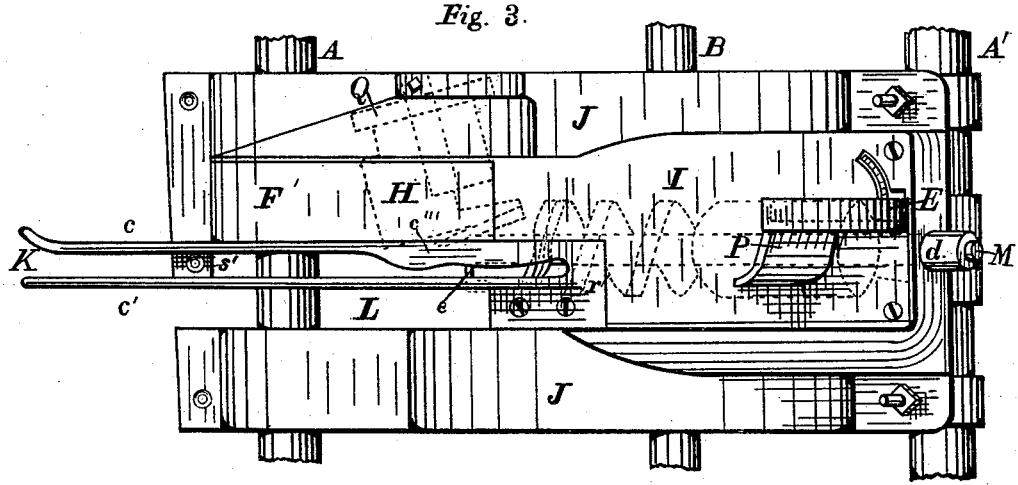
Witnesses
Jn.º F. Alden
O. W. Allison
Inventor
James R. Severance,
By his Attorney
Geo. B. Selden

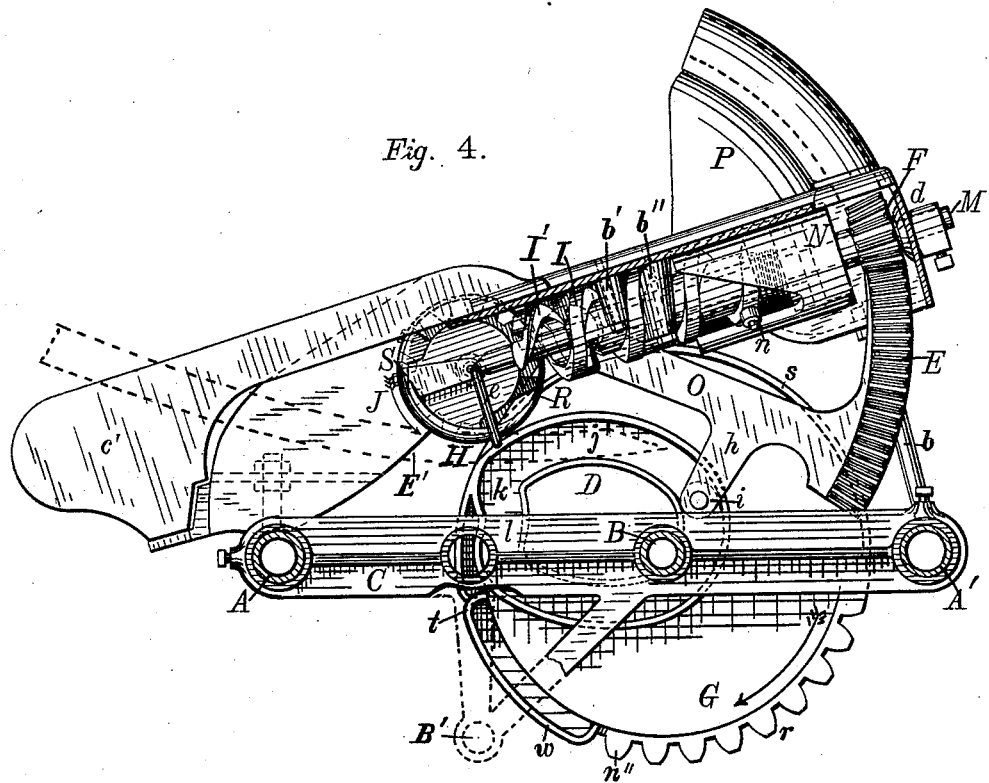
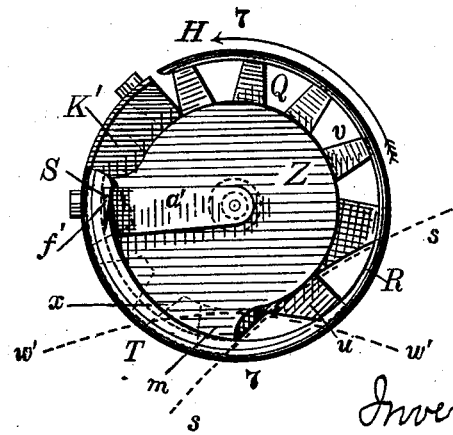

(No Model.) 5 Sheets—Sheet 3.
J. R. SEVERANCE.
KNOTTING MECHANISM FOR GRAIN BINDERS.
No. 452,456. Patented May 19, 1891.
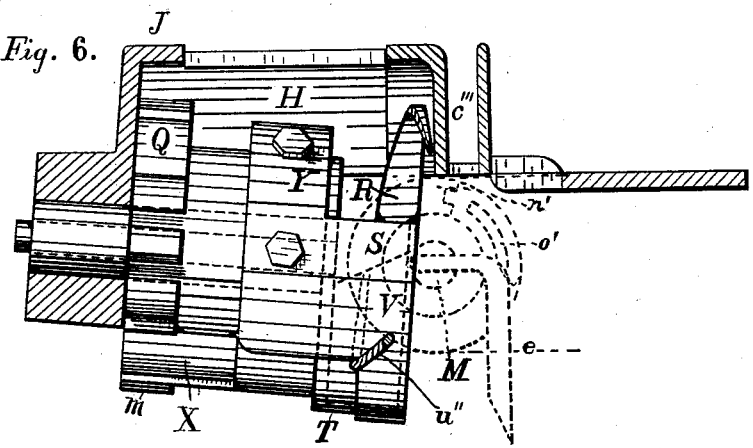
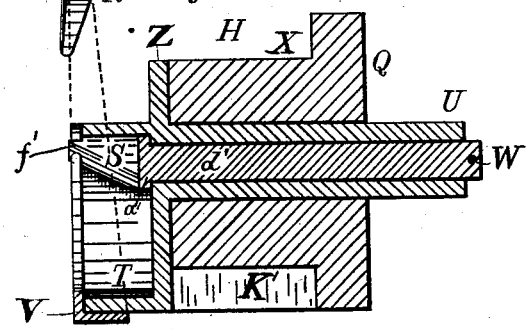
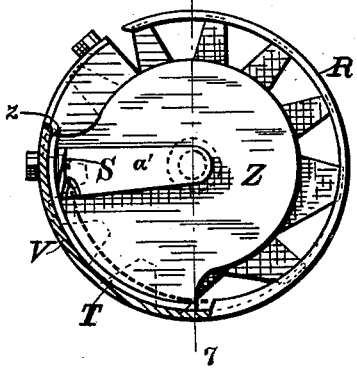
Witnesses
Jno. F. Alden
O. W. Allison
Inventor
James R. Severance,
By his Attorney
Geo. B. Selden.

(No Model.)  5 Sheets—Sheet 4.
J. R. SEVERANCE.
KNOTTING MECHANISM FOR GRAIN BINDERS.
No. 452,456.  Patented May 19, 1891.
Fig. 9.
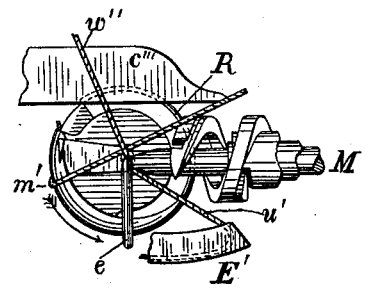
Fig. 12.
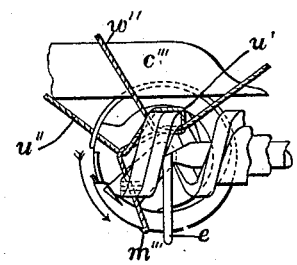
Fig. 10.
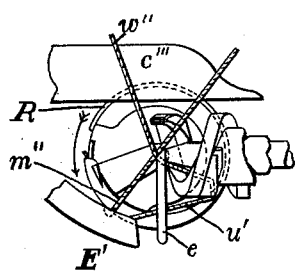
Fig. 13.
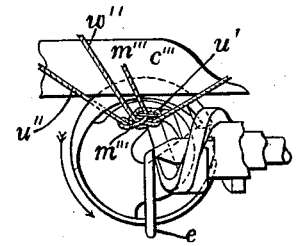
Fig. 11.
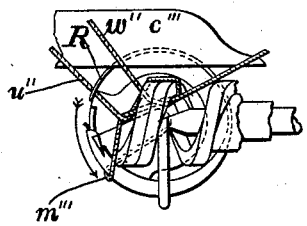
Fig. 14.
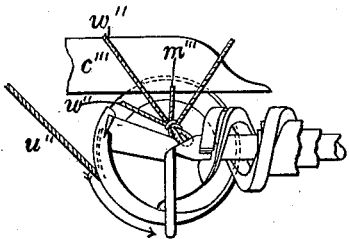
Fig. 15.
Witnesses:
Jno. F. Alden
O. W. Allison
Inventor:
James R. Severance,
by Geo. B. Selden,
atty (No Model.) 5 Sheets—Sheet 5.

J. R. SEVERANCE.
KNOTTING MECHANISM FOR GRAIN BINDERS.

No. 452,456. Patented May 19, 1891.

Witnesses:
Jno. F. Alden
O. W. Allison

Inventor:
James R. Severance,
by Geo. B. Selden.
Atty.

UNITED STATES PATENT OFFICE.

JAMES R. SEVERANCE, OF POUGHKEEPSIE, NEW YORK.

KNOTTING MECHANISM FOR GRAIN-BINDERS.

SPECIFICATION forming part of Letters Patent No. 452,456, dated May 19, 1891.

Application filed August 14, 1890. Serial No. 362,010. (No model.)

*To all whom it may concern:*

Be it known that I, JAMES R. SEVERANCE, of Poughkeepsie, in the county of Dutchess and State of New York, have invented certain Improvements in Knotting Mechanism for Grain-Binders, of which the following is a specification, reference being had to the accompanying drawings.

My present invention relates to certain improvements in the construction of knotting mechanism for grain-binders of that type shown in my patents, No. 237,135, dated February 1, 1881, and No. 382,773, dated May 15, 1888.

My improvements are fully described and illustrated in the following specification and accompanying drawings, and the novel features thereof specified in the claims annexed to the said specification.

My improvements in knotters are represented in the accompanying drawings, in which—

Figure 16:
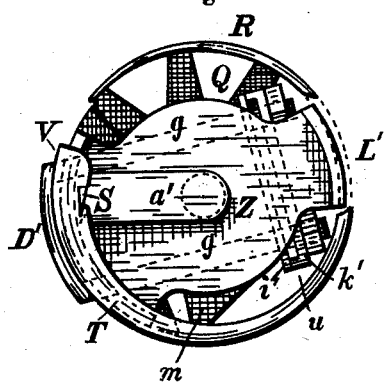
Figure 17:
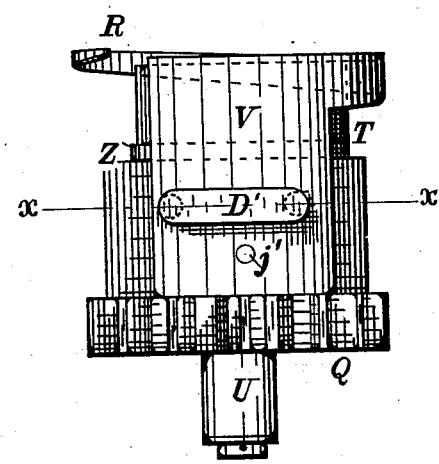
Figure 19:
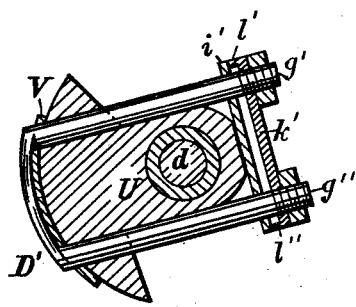
Figure 18:
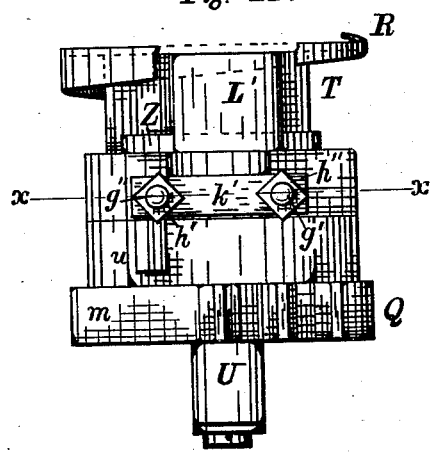

Figure 1 is a plan view, the knotter-casing being partially broken away to show the parts underneath. Fig. 2 is a central longitudinal section through the knotter-spirals, showing the cam-shell partially in elevation. Fig. 3 is a plan view of my improved knotter. Fig. 4 is a section on the line 4 4, Fig. 1, showing the knotting mechanism in side elevation. Fig. 5 is an elevation of the cord holder and cutter as seen from the inside. Fig. 6 is a side elevation of the cord-holder. Fig. 7 is a section of the same on the line 7 7, Fig. 8, showing the parts to the left of that line. Fig. 8 is an elevation of the cord holder and cutter, showing the clamping-plate partially in section. Fig. 9 is a diagrammatic representation showing the position of the parts at the commencement of the knotting operation, one end of the band being secured in the holder and the other end carried around the bundle and brought within the path of the spirals by the binder-arm. Fig. 10 is a diagram representing the position of the parts after the spirals have engaged the binder-arm end of the band and the cord-holder and horn have advanced, bringing the point of the horn in position to engage the cord on the continued backward motion of the binder-arm. Fig. 11 shows the position of the parts after the spirals have completed their forward movement. Fig. 12 represents the position of the parts when the end of the band has been carried into the jaws on the spirals by the movement of the cord-holder. Fig. 13 represents the position of the parts at the time when the loop is about to come off the points of the spirals during the return movement of the spirals. Fig. 14 represents the completion of the knot, the jaws of the spirals having released the cord and the binder-arm end of the cord having been severed by the knife and gripped by the cord-holder. Fig. 15 is a diagram representing the knot in loose or open formation. Fig. 16 is a view of the cord holder and cutter, showing the adjustable spring for the clamping-plate and the clearer. Fig. 17 represents the same as seen from the left hand in Fig. 16. Fig. 18 represents the same as seen from the right hand in Fig. 16. Fig. 19 is a transverse section on the line $x\ x$, Figs. 17 and 18.

In the accompanying drawings, A A' are the parallel rods of the binder-frame, and B the driving-shaft of the knotter.

B', Fig. 4, is the intermediate shaft for driving the binding mechanism.

C, Fig. 4, is a cross-bar uniting the rods A A' immediately underneath the knotter and serving to support the driving-shaft B near the combined cam and segmental gear D G. The cam D actuates the vibrating toothed segment E, which transmits motion to the knotter-spirals I I'. The driving-shaft B makes a single revolution for each bundle bound. The segmental gear G operates the cord holder and cutter H.

The knotter herein described is designed to be used in connection with any suitable binding mechanism—such, for instance, as that shown in my patents, Nos. 237,135 and 345,546, or in my pending applications, Serial Nos. 217,390 and 220,509.

The knotter-casing J is attached to the rod A by the bolts $a\ a$, Fig. 1, and to the rod A' by the standards $b\ b$. It is given a suitable shape adapted to inclose and protect the operative parts of the knotter, its upper surface preferably having a general inclination downward toward the grain-receiving side of the apparatus. The point of the needle or binder arm E′, Fig. 4, enters the slot K, Fig. 1, to bring the cord within the grasp of the knotter-spirals, the sides of the slot being provided with the upwardly-projecting flanges c c′. A slot L permits the movement of the reciprocating gate or side compressor described in my pending applications, Serial Nos. 217,390 and 220,509. The knotter-casing J may be made in one or more pieces, as convenience may dictate. As indicated in the drawings, the flanges or guards c c′ are formed in one piece, being connected together at r′ s′, Fig. 3, so as to be detached from the casing J. Access is had to the knotter through a removable section F′, Fig. 3. The axis or stem M, which supports the knotter-spirals, is secured in the boss d on the outer end of the knotter-casing. At its inner end the stem is provided with the cord-guide e, which guides the cord within the path of the points of the knotter-spirals.

The construction and operation of the knotter-spirals are substantially similar to that shown in my patent, No. 382,773, dated May 15, 1888. They are, however, driven in a simpler and better manner, and the use of the journal-boxes b′ b″ enables me to dispense with the bracket or support at the inner end of the knotter-stem in the construction shown in the said patent and to provide the end of the stem with the cord-guide e. The free portions of the spirals are also made somewhat shorter. The omission of the bracket facilitates the construction and permits the free parts of the spirals to be shorter and consequently stiffer. The spirals are operated by the cam-shell N, which revolves on the stem M, receiving motion from the knotter-driving shaft B by the cam D, vibrating segmental rack E, and pinion F. The cam D may be independently attached to the shaft, or it may, as indicated in the accompanying drawings, be formed with the segmental gear G, which actuates the cord-holder H. The rack E is supported by the radial bar O, which is pivoted at g, Fig. 1, to a lug depending from the knotter-casing or other suitable support. An arm h, attached to the bar O, carries the roller i, fitting the groove j of the cam D. As shown in the side view, Fig. 4, the cam-groove j is made of such a shape as to give the rack E an approximately uniform motion up and down, except at the extremity of its upward motion, where it is started downward by the portion of the groove marked k, and then arrested for a short interval by that part of the groove marked l, which is concentric with the axis of revolution, after which the rack then descends nearly uniformly. The object of this arrangement will be understood when it is stated that the jaws on the ends of the spirals close on the cord while the roller i is passing through the cam-groove at k, and that the commencement of the further return movement of the spirals is delayed while the roller i traverses the concentric portion l of the cam-groove, in order to permit the cord-holder time to let go of the end of the cord. The rack E during its upward movement is protected by the guard P, Fig. 4, which projects above the knotter-casing, and also serves as a detent to close the outer side of the binding-receptacle. The bar O is bent or offset at its outer end, so that it may swing clear of the cam-shell N while sustaining the rack E in mesh with the pinion F. A lug o, Fig. 1, cast on or secured to the knotter-casing, supports the back of the rack E and keeps it engaged with the pinion. The pinion F is attached to the cam-shell by a suitable sleeve or collar p, Fig. 2, so that the shell revolves with the pinion.

The movements of the spiral are substantially the same as those described in my before-mentioned application—that is, as the cam-shell revolves the spirals screw themselves forward toward the cord-holder through the journal-boxes b′ b″, and at the extremity of their forward movement the jaws at the free ends of the spirals are opened, so as to receive the cord by the roller or knurl n coming in contact with a suitable stop on the knotter-casing, so that the spiral I is arrested in its movement, while the other spiral I′ continues to advance, thus separating the jaws at the extremities of the spirals. The open condition of the jaws n′ o′ is indicated in Fig. 2. The knurl n travels entirely out of the track q′ in the cam-shell N and comes in contact with a stop on the casing located at r′, Fig. 1, in about the same horizontal plane as the axis of the spirals. The journal-boxes b′ b″ are made of a form adapted to fit the thread and sustain the body of the spiral I′, being divided in the horizontal plane and secured together and to the casing by suitable screws, or one of the journal-boxes may be made integral with the casing.

The construction and operation of the cam-shell N are the same as described in my previous patent, No. 382,773, dated May 15, 1888. It is provided with two longitudinal tracks, in which the rollers or knurls attached to the spirals I I′ travel, and with a spring t, Fig. 2, by which devices the operations of opening and closing the jaws n′ o′ are performed at the proper times, as described in said last-mentioned patent.

Proceeding now to a description of the cord holder and cutter, it consists, essentially, of the intermittently-revolving pinion Q, carrying the clamping-plate V, the hook or horn R, and the knife S. The clamping-plate confines the end of the cord against the stationary segmental circular clamping-jaw T. The cord-holder is supported on a shaft U, which is held in a boss on the knotter-casing by a screw or other suitable device q, Fig. 1. It will be observed from Fig. 1 that the shaft of the cord-holder is set at an angle with the axis of the spirals in order to enable the hook R to clear the spirals as it revolves and to facilitate the seizing of the cord. The axis of the cord-holder is also inclined downward, so that its prolongation intersects the shaft B.

As indicated in the drawings, the shaft U is made hollow to receive the stem d', Fig. 7, of the knife S. The pinion Q is provided with a hub X, having a projection K', to which the clamping-plate and horn are attached, as indicated at Y, Fig. 6, so that the horn and the clamping-plate revolve with the pinion. The shaft U is provided with a plate or disk Z, which carries the segmental clamping-jaw T. The arrangement of the parts will be readily understood from an examination of Figs. 7 and 8, from which it will be perceived that the clamping-plate revolves outside the clamping-jaw and that the knife revolves inside of it. The clamping-plate is made slightly flexible or elastic, so that the end of the cord will be compressed or held by friction between the clamping-plate and the jaw. The knife S as it revolves severs the cord against the end of the clamping-jaw T, the outside of the knife being turned to fit against the inside of the jaw. The outer edge of the end of the clamping-plate is rounded, so as to facilitate the entrance of the cord between it and the clamping-plates, as indicated at z, Fig. 8.

The horn R, the clamping-plate, and the knife make one revolution for each knot tied by the mechanism, being actuated by the segmental rack r on the gear G. The rim of the gear is provided with the delay-shoe s, which fits against a corresponding surface on the pinion Q, as indicated by the dotted line s in Fig. 5, and which holds the pinion from rotating during a part of the revolution of the gear. The pinion is also provided with the tooth u, placed on one side of the rim of teeth v, which as the gear revolves is struck by the forward end t, Fig. 4, of the delay-shoe w on the gear, so that the pinion and attachments are given a partial rotation at this time and are then held stationary, while the delay-shoe w passes along between the tooth u and the second tooth x of the rim of teeth v, which is extended lengthwise of the axis of the pinion, so as to lie across the path of the shoe w. The path of the rim of the shoe w is indicated by the dotted line w' in Fig. 5. After the shoe w has passed beyond the tooth x the revolution of the pinion is completed by the engagement of the teeth v of the pinion Q with those of the rack r, the first tooth n'', Fig. 4, of the rack coming in contact with the tooth n of the pinion.

The knife S is carried by an arm a', which extends radially inward toward the center of the pinion, and is provided with a central stem d', Fig. 7, which passes either partially or entirely through the axis U of the pinion. The outer end of the knife is fitted to a notch in the inner margin of the clamping-plate V, as indicated at f', Figs. 5 and 7. This notch serves to cause the knife to revolve with the clamping-plate and horn. The knife S is sharpened on its forward edge, as indicated in the drawings. The knife, the arm a', and the stem d' are conveniently formed by forging in one piece. Where the stem of the knife passes entirely through the axis U a pin or other device is used to hold it in place, as indicated at W, Fig. 7.

It will be understood that the pinion, clamping-plate, horn, and the knife, with its arm and stem, revolve together with the pinion, while the axis U, disk Z, and clamping-jaw T remain stationary.

In Figs. 16, 17, 18, and 19 I have represented the cord holder and cutter as provided with a clamping-plate having an adjustable spring and also with a clearer. In this case the clamping-plate V, instead of being secured to the pinion by screws, as indicated at Y, Fig. 6, is attached thereto by the staple D', the arms g' g'' of which are threaded and provided with nuts h' h'', which compress the spring i', so as to draw the clamping-plate toward the pinion with a yielding pressure. In addition to the arms of the staples, which pass through the clamping-plate, the latter may be attached to the pinion by one or more pins j', Fig. 17. The construction and arrangement of the teeth of the pinion, the delay-surfaces, the horn, and clamping-jaw are the same as before described. The elasticity of the spring is increased by the bearing-plate k', which is interposed between the spring and the nuts and has its ends l' l' bent inward, so as to bear on the ends of the spring.

The disk Z is extended outward opposite or nearly opposite the clamping-jaw and carries the clearer L', which passes between the clamping-plate and the knife as these parts revolve, so as to clean out the space between them of any pieces of cord, straw, or other refuse.

The operation of my improved knot-tying mechanism is as follows: The end of the cord being held in the cord-holder at m', Fig. 9, the other part of the cord is passed around the bundle and brought within the path of the knotter-spirals by the binder-arm E'. The cord passes under the horizontal part of the cord-guide e on the end of the axis M of the spirals and is prevented by its downward extension from traveling out of the path of the spirals. The spirals now begin to move forward and their points pass under the cord u', Fig. 9, and around below the axis M and upward behind it, as represented in Fig. 10. The cord-holder has now made its first movement, bringing the cord from m', Fig. 9, to m'', Fig. 10, so that the points of the spirals pass over above it, as shown in Fig. 10. The binder-arm has in the meantime begun its return movement, drawing the cord u', Fig. 10, around the spirals and forming a loop. The point of the horn R has also emerged from behind the guide-plate c''' (see Fig. 3) and projects below the same, as indicated in Fig. 10, in position to engage the cord u'', Fig. 11, as it is drawn upward by the continued backward motion of the binder-arm. At the extremity of their forward movement the jaws on the ends of the spirals are opened and the cord m''', Fig. 11, is placed between them by the revolution of the cord-holder, which has again commenced. The jaws now close on the cord, the cord-holder releases the cord by carrying it beyond the end of the stationary clamping-plate, and the spirals commence their backward movement. The return movement of the spirals carries the end of the cord held in the jaws through the loop $u'$, formed on the spirals, as indicated in Fig. 13. The continued movement of the cord-holder carries the cord $u''$ into the path of the clamping-plate, between which and the clamping-jaw it is gripped, as indicated in Fig. 14. The cord is severed by the knife S against the edge of the clamping-jaw shortly after the cord has been gripped between the jaw and the clamping-plate. The continued backward movement of the spirals draws the knot tight, and at the end of this movement the jaws are opened, so as to release the knot, as represented in Fig. 14.

Fig. 15 shows the knot in open formation, from which condition it would be pulled tight by the backward movement of the needle drawing on the cord $u''$.

The rotation of the cord-holder may be made continuous by a proper adjustment of the parts and timing of the movements of the spirals.

I claim—

1. The combination, with the knotter-casing having a guard projecting upward therefrom, of the knotter-spirals, their supporting-axis and cam-shell, and the vibrating rack for operating the spirals, arranged to travel in a path protected by a guard, substantially as described.

2. The combination, with the knotter-casing having a guard projecting upward therefrom, of the knotter-spirals, their supporting-axis and cam-shell, the vibrating rack for operating the spirals, arranged to travel in a path protected by the guard and pivoted to the casing, and the revolving cam for vibrating the rack, substantially as described.

3. The combination, with the knotter mechanism of a grain-binder, of the knotter-casing having a projecting rack-guard attached to its outer end, adapted to form the outer side of the binding-chamber and to protect the knotter-operating rack during its vibration, substantially as described.

4. The combination, in a cord-holder, of the revolving clamping-plate, horn, and knife with the stationary clamping-jaw and the clearer L', substantially as described.

5. The combination, in a cord-holder, of the revolving pinion Q, stationary clamping-jaw T, horn R, and clamping-plate V, secured to the pinion by an adjustable spring, substantially as described.

JAMES R. SEVERANCE.

Witnesses:
GEO. B. SELDEN,
C. G. CRANNELL.